United States Patent [19]

Overbury

[11] 3,953,854

[45] Apr. 27, 1976

[54] DOPPLER RADIO NAVIGATION BEACON SYSTEM WITH MEANS FOR REDUCING MULTIPATH SIGNAL EFFECTS

[75] Inventor: Francis G. Overbury, Cuffley, England

[73] Assignee: International Standard Electric Corporation, New York, N.Y.

[22] Filed: June 17, 1974

[21] Appl. No.: 479,770

[30] Foreign Application Priority Data
June 21, 1973 United Kingdom............... 29502/73

[52] U.S. Cl. ........................ 343/106 D; 343/108 M
[51] Int. Cl.² .......................................... G01S 1/40
[58] Field of Search ..................... 343/106 D, 108 M

[56] References Cited
UNITED STATES PATENTS 3,094,697   6/1963   Kramar et al................... 343/106 D
3,704,465   11/1972  Masak et al................. 343/108 M X Primary Examiner—Maynard R. Wilbur
Assistant Examiner—Richard E. Berger
Attorney, Agent, or Firm—William T. O'Neil

[57] ABSTRACT

A Doppler Navigation ground beacon antenna commutating arrangement in which the primary scan program radio frequency and reference radio frequency signals are both applied to the antenna elements in mutually opposite commutation directions. The two signals are separated in frequency, as they are in the prior art fixed reference antenna arrangement; accordingly, a fixed reference antenna is no longer required. The novel system greatly reduces the effect of multipath reference signals, especially in situations where there is one or more inopportunely located reflecting object.

5 Claims, 1 Drawing Figure

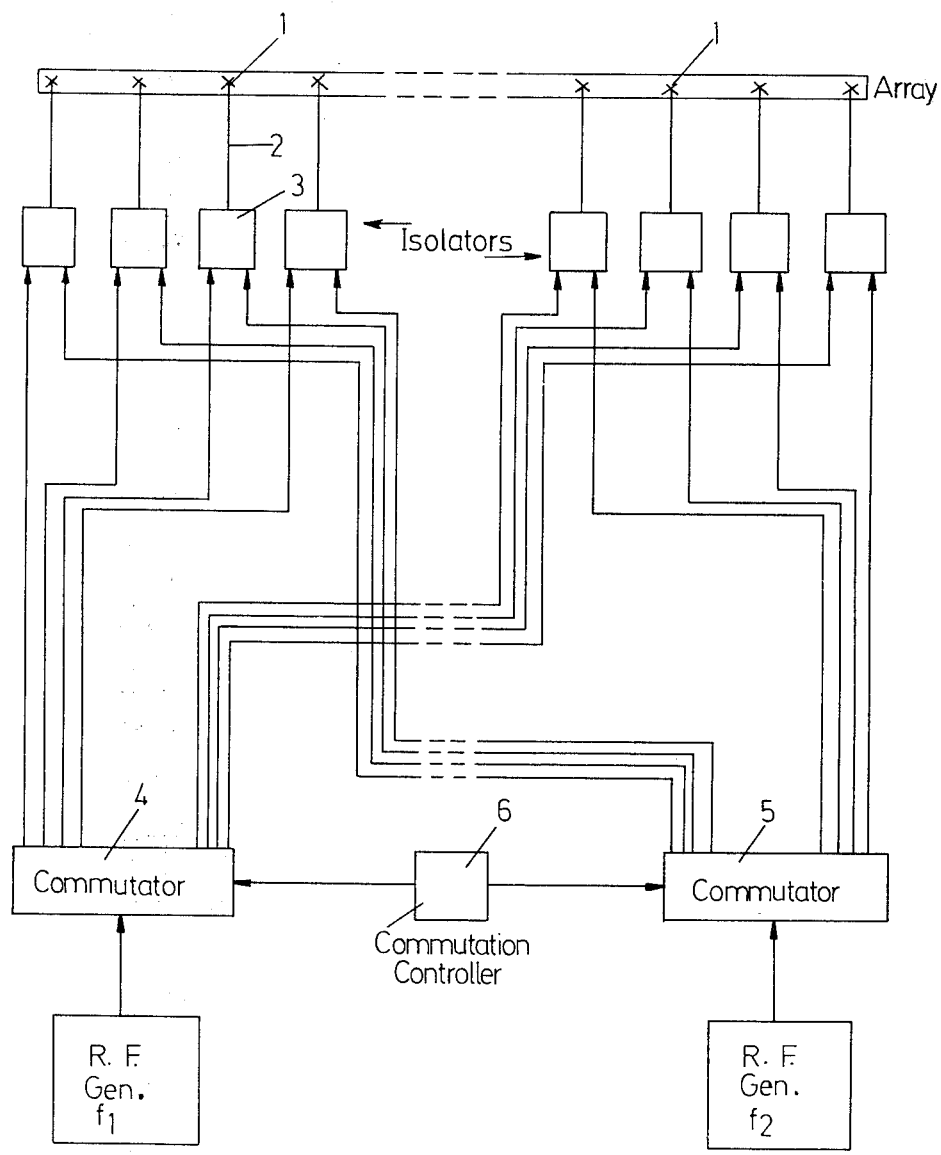

DOPPLER RADIO NAVIGATION BEACON SYSTEM WITH MEANS FOR REDUCING MULTIPATH SIGNAL EFFECTS

BACKGROUND OF THE INVENTION

1. Field of the Invention

This invention relates generally to radio navigation systems, and particularly to beacon equipment for such systems of the simulated Doppler type.

2. Description of the Prior Art

In British Pat. Nos. 1,225,190 and 1,234,541, known systems of the simulated Doppler type are described. In Doppler beacons according to that prior art, a source of radio frequency energy is commutated to separate radiator elements of a linear array to simulate unidirectional or bidirectional constant velocity motion of the source. Navigational information can be air-derived from these beacons, since the Doppler shift of frequency caused by commutation is proportional to the cosine of the angle which a radio receiver of the system subtends with respect to the line of apparent movement of the source.

The Doppler navigation system outlined above typically operates at a radio frequency of one or more GHz, and since the maximum Doppler frequency shift is of the order of a few KHz, it is necessary in practice to use a reference radiator at the beacon, the latter radiating a second radio frequency slightly offset from the commutated frequency, e.g., by 20 KHz. The Doppler shift to the frequency of the moving component is then detected as a change of the beat frequency between the moving component and the reference signal. Thus the indicated change of beat frequency, which bears the navigational information, is determined by the change of path difference between the two path lengths corresponding to successive commutation cycles.

With the fixed reference radiator of the above described system, this change of path length arises solely from the movement simulated by the array commutation. There is always the possibility of multipath situations occurring due to interference with the reference component being radiated from a fixed point. A multipath situation is one in which, in addition to the desired signal component (by direct propagation), there are also generated, unwanted components (by reflection). It will be apparent from knowledge of the aforementioned prior art, that the effect of multipath signal components at the airborne location is to deteriorate the accuracy of the angle determination process.

SUMMARY OF THE INVENTION

It is the general object of the present invention to improve the performance of the beacon by reducing the probability of such situations arising.

According to the invention there is provided a radio navigation beacon including a linear array of equally spaced radiating elements. Means are also included for commutating first radio frequency energy to each said elements in turn, for commutating to each said element in turn, second radio frequency energy (of a frequency which differs by a fixed amount from the first radio frequency), and for programming these commutations at the same rate and substantially in antiphase relationship, whereby the two frequencies are simultaneously commutated along the array in opposite directional senses.

BRIEF DESCRIPTION OF THE DRAWING

A single FIGURE is presented, depicting the system of the invention in schematic block diagram form.

DESCRIPTION OF THE PREFERRED EMBODIMENT

A preferred embodiment of the invention will now be described with reference to the single FIGURE of the accompanying drawing which shows a radio navigation beacon.

The beacon, according to the invention, comprises a linear array of equally spaced radiation elements (radiators), typically identified by the numeral 1. The array is horizontal for azimuth guidance, or vertical for elevation guidance. As has already been indicated earlier in this specification, a moving source of radio frequency energy is simulated by the successive commutation of the source to adjacent elements of such a Doppler array. Moreover, it is known that the spacing of the elements is determined by the limiting phase transients which can be tolerated between successive samples of received signal. In general, this transient corresponds to a phase jump of 120°. Accordingly, this determines the maximum practical spacing of the elements, which may be spaced as close as one third wavelength at the operating frequency, typically 5GHz.

Each of the radiators of the array is connected via a feeder, typically 2, to an isolator, typically 3, fed by two inputs one from a commutator 4 and the other from a commutator 5. The commutators are operated synchronously by a controller 6 to commutate two different radio frequencies to the array in opposite directions.

One commutator, 4, is arranged to commutate a first radio frequency $f_1$, e.g., at 5GHz while the other commutator 5 is arranged to commutate a different radio frequency $f_2$ which is an upper (or lower) sideband of $f_1$ with an offset of, e.g., 20KHz.

The commutation frequencies (scan rates) of the two commutators 4 and 5 are the same, as determined by the controller 6, but are in substantially antiphase relationship. Thus assuming the array scan by the commutator 4 to commence at the left hand element of the array, the scan by the commutator 5 would be commencing at the right hand element. The two frequencies $f_1$ and $f_2$ are commutated along the array in opposite directions, $f_1$ progressing to the right and $f_2$ to the left.

With fully synchronous antiphase relationship operation of the two commutators, two elements are, at any time, simultaneously energized, one at $f_1$ and the other at $f_2$, except when the center element is energized in an array containing an odd number of elements. Slight departure from the fully synchronous condition may be programmed so that energization by one commutator alternates with energization by the other commutator, i.e., the two commutations are interleaved in time.

It will be realized, that neither the first nor second signal ($f_1$ nor $f_2$) reaches any airborne receiving equipment by a fixed path, thereby ameliorating the problem of a particular (fixed) reference multipath signal.

It is to be understood that the foregoing description of a specific example of this invention is made for illustration only and is not to be considered as a limitation on its scope.

The instrumentation of the controller 6 is readily accomplished by those skilled in this art, either in the fully synchronous, simultaneously radiating form or the interleaved form hereinbefore described.

What is claimed is:

1. In a radio navigation beacon of the Doppler type including a linear array having a plurality of substantially uniformly spaced, separately excitable, radiating elements, the combination comprising:
   radio frequency generators for producing unmodulated, substantially frequency constant $f_1$ and $f_2$ excitation signals differing from each other by a predetermined fixed amount;
   a first commutator for applying said $f_1$ unmodulated signal to a contigous fraction of said array elements successively in a first directional sense;
   a second commutator for applying said unmodulated $f_2$ signal to said contiguous fraction of said array elements successively in a second directional sense; and
   programming means for controlling said first and second commutators to provide substantially synchronous commutation such that each of said commutators completes a cycle of commutation including the same number of elements of said array in substantially the same time.

2. Apparatus according to claim 1 including a plurality of isolators equal in number to said contiguous fraction of said array elements, said isolators each being connected between a given one of said array elements and a terminal of each of said commutators corresponding to an excitation connection to said given element.

3. Apparatus according to claim 1 in which said number of elements of said array in a cycle of commutation by said first and second commutators is all the elements of said array.

4. Apparatus according to claim 1 in which said programming means controls said first and second commutators to excite successive elements in their corresponding directions such that during the time one element is excited with $f_1$ another is excited with $f_2$.

5. Apparatus according to claim 1 in which said programming means controls said first and second commutators to excite successive elements in their corresponding directions in an interleaved program such that between the time successive elements are excited by $f_1$, another element is excited by $f_2$.

* * * * *